United States Patent
Ikegaya et al.

(10) Patent No.: US 6,528,142 B2
(45) Date of Patent: *Mar. 4, 2003

(54) ANTIREFLECTION COATING

(75) Inventors: Tatsuo Ikegaya, Shizuoka (JP); Tomio Hirano, Shizuoka (JP)

(73) Assignee: Yazaki Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/993,491

(22) Filed: Dec. 18, 1997

(65) Prior Publication Data

US 2001/0049005 A1 Dec. 6, 2001

(30) Foreign Application Priority Data

Dec. 26, 1996 (JP) .............................. 8-348700

(51) Int. Cl.[7] .............................. G02B 1/11; G02B 5/28
(52) U.S. Cl. .................... 428/141; 428/411.1; 428/212; 428/213; 428/143; 428/323; 428/913; 428/169; 349/112; 359/599; 359/586; 359/589; 359/580; 359/581; 359/601; 359/615
(58) Field of Search ............................. 428/141, 411.1, 428/212, 213, 143, 323, 913, 169; 349/112; 359/599, 586, 589, 580, 581, 601, 615

(56) References Cited

U.S. PATENT DOCUMENTS

| 2,466,119 A | | 4/1949 | Moulton et al. .................. 88/1 |
| 2,584,905 A | | 2/1952 | Moulton et al. ............. 106/287 |
| 4,131,488 A | * | 12/1978 | Lesk et al. .................... 148/1.5 |
| 4,278,632 A | | 7/1981 | Yoldas ......................... 264/66 |
| 4,331,703 A | * | 5/1982 | Lindmayer .................... 427/37 |
| 4,448,487 A | * | 5/1984 | Cuomo et al. ............... 350/164 |
| 4,596,745 A | * | 6/1986 | Chao ............................ 428/428 |
| 4,753,516 A | * | 6/1988 | Doi et al. ..................... 350/321 |

(List continued on next page.)

FOREIGN PATENT DOCUMENTS

| DE | 37 00 828 | 7/1988 |
| DE | 289 443 | 5/1991 |
| EP | 0 660 138 A2 | 6/1995 |

OTHER PUBLICATIONS

Dean, John A. Editor, "Lance's Hand Book of Chemistry" 13th Ed., 1985, McGraw Hill, N.Y. N.Y. pp. 4–104 through 4–106.*

Nguyen, S.V. et al. "Plasma Deposition & Characterization of Thin Silicon–Rich Silicon Nitride Films" J. Electrochem Soc. vol. 134, No. 9, p. 2324, Sep. 1987.*

*Primary Examiner*—William P. Watkins, III
(74) *Attorney, Agent, or Firm*—Sughrue Mion, PLLC

(57) ABSTRACT

Antireflection coating on a substrate which is coated with a low refractive index layer having a specified refractive index which in turn is coated with a high refractive index layer having a higher refractive index than the low refractive index layer, is either characterized in that a roughened surface which scatters and reflects the incident light entered into the low refractive index layer in contact with the substrate is formed at the interface between the low refractive index layer and the substrate, or that a light-diffusing layer which scatters and reflects the incident light entered into the low refractive index layer in contact with the substrate is formed at the interface between the low refractive index layer and the substrate, or that a hard coating layer in contact with the low refractive index layer is formed by dispersing a light-diffusing material in the hard coating layer, which scatters and reflects the incident light entered into the low refractive index layer.

10 Claims, 3 Drawing Sheets

U.S. PATENT DOCUMENTS

| | | | | |
|---|---|---|---|---|
| 4,802,737 A | * | 2/1989 | Denton | 350/166 |
| 4,834,501 A | * | 5/1989 | Honda et al. | 350/321 |
| 4,842,378 A | * | 6/1989 | Flasck et al. | 350/345 |
| 5,011,782 A | * | 4/1991 | Lamb et al. | 437/2 |
| 5,051,652 A | * | 9/1991 | Isomura et al. | 313/479 |
| 5,245,468 A | * | 9/1993 | Demiryont et al. | 359/359 |
| 5,254,904 A | * | 10/1993 | Van De Leest et al. | 313/479 |
| 5,644,373 A | * | 7/1997 | Furushima et al. | 349/158 |
| 5,804,102 A | * | 9/1998 | Oi et al. | 252/587 |
| 5,812,264 A | * | 9/1998 | Nakamura et al. | 356/369 |
| 5,815,313 A | * | 9/1998 | Mitani et al. | 359/448 |
| 5,847,795 A | * | 12/1998 | Satoh et al. | 349/137 |
| 5,851,674 A | * | 12/1998 | Pellerite et al. | 428/421 |
| 5,869,128 A | * | 2/1999 | Meulendijks et al. | 427/64 |
| 5,896,119 A | * | 4/1999 | Evanicky et al. | 345/87 |

* cited by examiner

ANTIREFLECTION COATING

BACKGROUND OF THE INVENTION

The present invention relates to an antireflection coating, and particularly relates to one which not only reduces the reflection of ambient light on the surface of a display screen of an indicator such as a vehicle meter or a display on a personal computer but also increases the contrast on the display screen, thereby enhancing the visibility of the information displayed on the display screen and reducing the stresses on the operator's eyes.

FIGS. 4(a) and 4(b) are sectional views of two prior art antireflection coatings. Each is of an exemplary case where a single high refractive index layer 1 and a single low refractive index layer 2 are coated in superposition on a substrate 3.

The prior art antireflection coating 9 shown in FIG. 4(a) comprises the substrate 3 which is coated with the low refractive index layer 2 having a specified refractive index which in turn is coated with the high refractive index layer 1 having a higher refractive index than the low refractive index layer.

Incident light 5 (specifically, ambient light-falling on the surface of the display screen of an indicator), as it enters the high refractive index layer 1 and the low refractive index layer 2, is reflected first at the interface between air and the high refractive index layer 1 (this interface is hereunder referred to as the "first interface"), then at the interface between the high refractive index layer 1 and the low refractive index layer 2 (this interface is hereunder referred to as the "second interface"), whereupon two beams of light reflection 4 are produced.

The optical thicknesses of the high refractive index layer 1 and the low refractive index layer 2 are so set that the reflected light 4 from the first interface has a phase difference of ¼λ from the light 4 reflected from the second interface; hence, the two beams of light reflection 4 optically interface with each other to become attenuated.

By taking advantage of this optical interference effect, it has been possible to reduce the reflection of ambient light (i.e., external light) on the surface of the display screen of an indicator such as a vehicle meter or a display on a personal computer while enhancing the contrast on the display screen, thereby providing a display of better quality.

In the antireflection coating 9 shown in FIG. 4(b), a hard coating layer 6 having a comparable refractive index to the substrate 3 is provided between the substrate and the low refractive index layer 2 such as to cancel the fine asperities in the surface of the substrate 3, thereby providing it with a higher degree of smoothness.

The hard coating layer 6 adds to the aforementioned optical interference effect so that the reflection of ambient light (external light) on the surface of the display screen is further reduced while achieving a further increase in the contrast on the display screen so as to provide a display of better quality.

In each of the prior art antireflection coatings 9 described above, the light 4 reflected from the first interface and the light 4 reflected from the second interface optically interface with each other to become attenuated; however, the light 4 reflected from the interface between the low refractive index layer 2 and the substrate 3 (or between the low refractive index layer 2 and the hard coating layer 6, and this interface will be hereunder referred to as "third interface") is not fully subjected to the above interference effect and the light 4 reflected from the third interface will be radiated in front of the substrate 3.

As a result, the reflected light 4 from the third interface causes a difficulty in that a reflected image due to the reflection of the ambient light appears on surface of the display screen of a vehicle meter or a display on a personal computer.

The reflected image causes the additional problem of reducing the contrast on the display screen and deteriorating the quality of the display produced.

SUMMARY OF THE INVENTION

The present invention has been accomplished in order to solve the aforementioned problems of the prior art, and an object of the invention is particularly to provide an antireflection coating on a substrate which is coated with a low refractive index layer having a specified refractive index which in turn is coated with a high refractive index layer having a higher refractive index than that low refractive index layer, which is either characterized in that a roughened surface which scatters and reflects the incident light entered into the low refractive index layer in contact with the substrate, is formed at the interface between the low refractive index layer and the substrate, or that a light-diffusing layer which scatters and reflects the incident light entered into the low refractive index layer in contact with the substrate, is formed at the interface between the low refractive index layer and the substrate, or that a hard coating layer in contact with the low refractive index layer is formed by dispersing a light-diffusing material in the hard coating layer, which scatters and reflects the incident light entered into the low refractive index layer. In either case, the reflected light from the third interface is scattered when it is radiated in front of the substrate, whereby the formation of a reflected image due to the reflection of the ambient light on the surface of the display screen of a vehicle meter or a display on a personal computer is effectively prevented to enhance the contrast on the display screen and produce a display of better quality.

According to a first aspect of the invention, an antireflection coating comprises one or more high refractive index layers having a specified refractive index which alternate with one or more low refractive index layers having a lower refractive index than that high refractive index layers, and is characterized in that a roughened surface which scatters and reflects the incident light entered into the terminal low refractive index layer, is formed on the surface of the terminal low refractive index layer.

According to a second aspect of the invention, an antireflection coating comprises a substrate which is coated with a low refractive index layer having a specified refractive index which in turn is coated with a high refractive index layer having a higher refractive index than that low refractive index layer, and is characterized in that a roughened surface which scatters and reflects the incident light entered into the low refractive index layer in contact with that substrate, is formed at the interface between that low refractive index layer and that substrate.

According to a third aspect of the invention, an antireflection coating comprises a substrate having a hard coating layer formed thereon, which layer is coated with a low refractive index layer having a specified refractive index which in turn is coated with a high refractive index layer having a higher refractive index than that low refractive index layer, and is characterized in that a roughened surface which scatters and reflects the incident light entered into the low refractive index layer in contact with that hard coating layer, is formed at the interface between that low refractive index layer and that hard coating layer.

According to the first to third aspects of the invention, the reflected light from the third interface is scattered by means of the roughened surface so that the formation of a reflected image due to the reflection of the ambient light (i.e., the reflected light) on the surface of the display screen of a vehicle meter or a display on a personal computer can be effectively prevented to enhance the contrast on the display screen and provide a display of better quality.

According to a fourth aspect of the invention, in the antireflection coating of the third aspect, that hard coating layer has a refractive index not higher than that of that substrate.

According to the fourth aspect of the invention, in addition to the advantages of the first to third aspects of the invention, the reflected light from the third interface is scattered more efficiently by means of the hard coating layer so that the formation of a reflected image due to the reflection of the ambient light (i.e., the aforementioned reflected light) on the surface of the display screen of a vehicle meter or a display on a personal computer can be prevented more efficiently to further enhance the contrast on the display screen and provide a display of even better quality.

According to a fifth aspect of the invention, an antireflection coating comprises one or more high refractive index layers having a specified refractive index which alternate with one or more low refractive index layers having a lower refractive index than that high refractive index layers, and is characterized in that a light-diffusing layer which scatters and reflects the incident light entered into the terminal low refractive index layer is formed on the surface of that low refractive index layer.

According to a sixth aspect of the invention, an antireflection coating comprises a substrate which is coated with a low refractive index layer having a specified refractive index which in turn is coated with a high refractive index layer having a higher refractive index than that low refractive index layer, and is characterized in that a light-diffusing layer which scatters and reflects the incident light entered into the low refractive index layer in contact with that substrate, is formed at the interface between that low refractive index layer and that substrate.

According to a seventh aspect of the invention, an antireflection coating comprises a substrate having a hard coating layer formed thereon, which layer is further coated with a low refractive index layer having a specified refractive index which in turn is coated with a high refractive index layer having a higher refractive index than that low refractive index layer, and is characterized in that a light-diffusing layer which scatters and reflects the incident light entered into the low refractive index layer in contact with that hard coating layer is provided at the interface between that low refractive index layer and that hard coating layer.

According to the fifth to seventh aspects of the invention, the reflected light from the third interface is scattered by means of the light-diffusing layer so that the formation of a reflected image due to the reflection of the ambient light (i.e., the aforementioned reflected light) on the surface of the display screen of a vehicle meter or a display on a personal computer can be effectively prevented to enhance the contrast on the display screen and provide a display of better quality.

According to an eighth aspect of the invention, in the antireflection coating of the seventh aspect, that hard coating layer has the same refractive index as that substrate.

According to the eighth aspect of the invention, in addition to the advantages of the fifth to seventh aspects of the invention, the reflected light from the third interface is scattered more efficiently by means of the hard coating layer so that the formation of a reflected image due to the reflection of the ambient light (i.e., the aforementioned reflected light) on the surface of the display screen of a vehicle meter or a display on a personal computer can be prevented more efficiently to further enhance the contrast on the display screen and provide a display of even better quality.

According to a ninth aspect of the invention, an antireflection coating comprises a substrate having a hard coating layer formed thereon, which layer is further coated with a low refractive index layer having a specified refractive index which in turn is coated with a high refractive index layer having a higher refractive index than that low refractive index layer, and is characterized in that the hard coating layer is formed with a light-diffusing material dispersed therein so as to scatter and reflect the incident light entered into the low refractive index layer in contact with that hard coating layer.

According to the ninth aspect of the invention, the reflected light from the third interface is scattered by means of the hard coating layer having a light-diffusing material dispersed therein so that the formation of a reflected image due to the reflection of the ambient light (i.e., the reflected light) on the surface of the display screen of a vehicle meter or a display on a personal computer can be effectively prevented to enhance the contrast on the display screen and provide a display of better quality.

According to a tenth aspect of the invention, in the antireflection coating of the ninth aspect, that coating layer has a refractive index not higher than that of that substrate.

According to the tenth aspect of the invention, in addition to the advantages of the ninth aspect of the invention, the reflected light from the third interface is scattered more efficiently by means of the hard coating layer having a light-diffusing material dispersed therein so that the formation of a reflected image due to the reflection of the ambient light (i.e., the aforementioned reflected light) on the surface of the display screen of a vehicle meter or a display on a personal computer can be prevented more efficiently to further enhance the contrast on the display screen and provide a display of even better quality.

DETAILED DESCRIPTION OF THE INVENTION

Preferred embodiments of the invention will now be described with reference to accompanying drawings.

Figure 1:
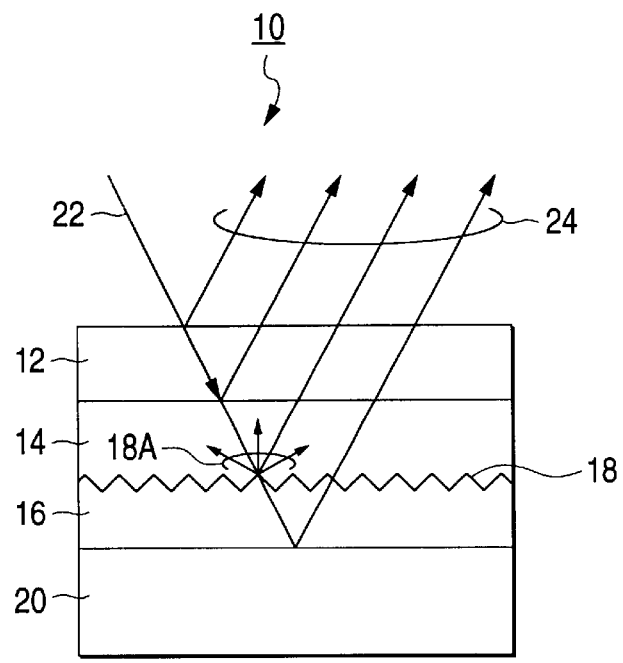
FIG. 1 is a cross section showing a first embodiment of the antireflection coating of the invention.

FIG. 1 is a sectional view showing a first embodiment of an antireflection coating 10 of the invention.

The antireflection coating 10 reduces the reflection of the ambient light (having wavelengths in the visible range) on the surface of the display screen of an indicator such as a vehicle meter (specifically a speedometer or a tachometer) or a display on a personal computer (specifically a liquid-crystal display or a CRT) so that the reflected light 24 is suppressed in imaging effect. In addition, the antireflection coating 10 is capable of enhancing the contrast on the display screen. As shown in FIG. 1, the antireflection coating 10 comprises a substrate 20 which has a hard coating layer 16 formed thereon, and the coating layer 16 is further coated with a low refractive index layer 14 having a specified refractive index which, in turn, is coated with a high refractive index layer 12 having a higher refractive index than that low refractive index layer 14.

In FIG. 1, the single low refractive index layer 14 and the single high refractive index layer 12 are superposed on the substrate 20. However, this is not the sole case of the invention and two or more sets of the low refractive index layer 14 and the high refractive index layer 12 may be superposed periodically on the hard coating layer 16.

As shown in FIG. 1, incident light 22 falling on the antireflection coating 10 (specifically, ambient light falling on the surface of the display screen of an indicator), as it enters the high refractive index layer 12 and the low refractive index layer 14, is reflected first at the first interface between air and the high refractive index layer 12, then at the second interface between the high refractive index layer 12 and the low refractive index layer 14, whereupon two beams of light reflection 24 are produced.

The optical thicknesses of the high refractive index layer 12 and the low refractive index layer 14 are so set that the reflected light 24 from the first interface has a phase difference of ¼λ from the light 24 reflected by the second interface; hence, the two beams of light reflection 24 optically interfere with each other to become attenuated.

The incident light 22 entered into the low refractive index layer 14 is scattered as shown by reference numeral 18A when it is reflected by the third interface (i.e., roughened surface 18).

By taking advantage of this optical interference effect, the reflection of the ambient light (i.e., external light) on the surface of the display screen of an indicator such as a vehicle meter or a display on a personal computer is reduced while, at the same time, the contrast on the display screen is sufficiently enhanced to provide a display of better quality.

The substrate 20 providing the surface of an indicator is desirably a glass substrate but it is also possible to use a resin substrate made of acrylic resin, PMMA, polystyrene, polycarbonate, PET and the like.

The hard coating layer 16 is provided between the substrate 20 and the low refractive index layer 14. This enables the fine asperities (specifically pinholes or scratches) in the surface of the substrate 20 to be sufficiently canceled to provide it with a higher degree of smoothness.

The thus provided hard coating layer 16 permits the aforementioned interference effect to be realized to a greater extent.

The hard coating layer 16 has preferably a refractive index not higher than that of the substrate 20, hence, the refractive index of the hard coating layer 16 is equal to or smaller than the refractive index of the substrate 20.

Thus, the reflected light 24 from the third interface is scattered more efficiently by means of the hard coating layer 16 so that the formation of a reflected image due to the reflection of the ambient light (i.e., the aforementioned reflected light 24) on the surface of the display screen of a vehicle meter or a display on a personal computer can be prevented more efficiently to further enhance the contrast on the display screen and provide a display of even better quality.

In addition, a roughened surface 18 which scatters and reflects the incident light entered into the low refractive index layer 14 in contact with the hard coating layer 16, is formed at the third interface between that low refractive index layer 14 and the hard coating layer 16.

Specifically, either the hard coating layer 16 or the low refractive index layer 14 or both, which define the third interface, are roughened to realize the roughened surface 18.

The geometry (i.e., roughness) of the roughened surface 18 is desirably such that it has periodic undulations and is sufficiently transparent not to produce a display of deteriorated quality. As shown in FIG. 1, the undulations (or heterogeneities) of the roughened surface 18 have an average size that is less than each of the thicknesses of the two layers 12, 14.

Thus, the reflected light 24 from the third interface is scattered by means of the roughened surface 18 so that the formation of a reflected image due to the reflection of the ambient light (i.e., the reflected light 24) on the surface of the display screen of a vehicle meter or a display on a personal computer can be effectively prevented to enhance the contrast on the display screen and provide a display of better quality.

The refractive indices of the low refractive index layer 14 and the high refractive index layer 12 are desirably set to be smaller than that of the substrate 20.

Specifically, the low refractive index layer 14 is desirably formed of $SiO_2$ (refractive index n=1.40–1.46) with a thickness of about 20 to 100 nm.

The high refractive index layer 12 is desirably formed of $TiO_2$ (n=1.80–2.20) with a thickness of about 10 to 100 nm.

The thin films of $SiO_2$ and $TiO_2$ are desirably formed by a sol-gel process and subsequently polymerized.

By thus designing the refractive indices of the hard coating layer 16, the low refractive index layer 14 and the high refractive index layer 12, the visibility of the information displayed on the display screen is sufficiently improved to reduce the stress on the eyes of the operator.

Figure 2:
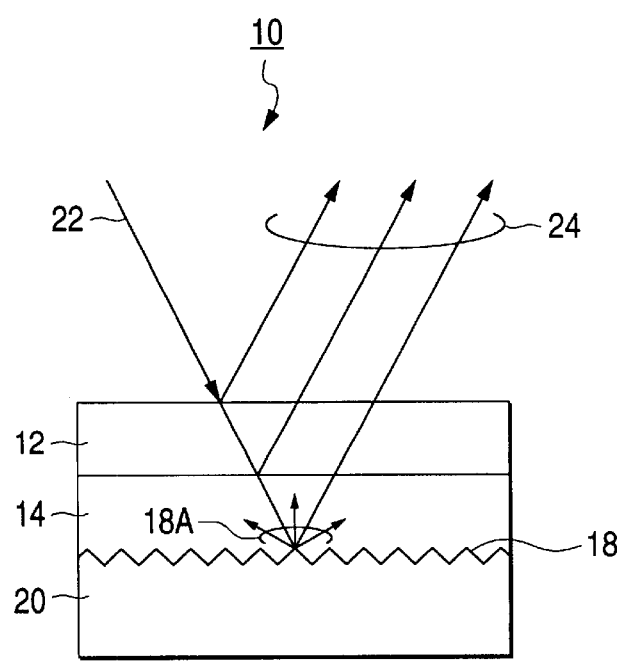
FIG. 2 is a cross section showing a second embodiment of the antireflection coating of the invention.

FIG. 2 is a cross section showing a second embodiment of the antireflection coating 10 of the invention. Those parts which are identical to the parts already described in connection with the first embodiment are identified by like numerals and will not be described redundantly.

A roughened surface 18 which scatters and reflects the incident light 22 entered into the low refractive index layer 14 in contact with the substrate 20, is provided at the third interface between the low refractive index layer 14 and the substrate 20.

The roughened surface 18 can be realized by roughening either the substrate 20 or the low refractive index layer 14 or both which define the third interface.

Specifically, the roughened surface 18 is formed on the terminal low refractive index layer 14 (i.e., most adjacent to the substrate 20) such that the incident light entered into the terminal low refractive index layer 14 is scattered when it is reflected.

In FIG. 2, the single low refractive index layer 14 and the single high refractive index layer 12 are superposed on the substrate 20. However, this is not the sole case of the invention and two or more sets of the low refractive index layer 14 and the high refractive index layer 12 may be superposed periodically on the substrate 20.

As shown in FIG. 2, incident light 22 falling on the antireflection coating 10 (specifically, ambient light falling on the surface of the display screen of an indicator), as it enters the high refractive index layer 12 and the low refractive index layer 14, is reflected first at the first interface, then at the second interface, whereby two beams of light reflection 24 are produced.

The optical thicknesses of the high refractive index layer 12 and the low refractive index layer 2 are so set that the reflected light 24 from the first interface has a phase difference of ¼λ from the light 24 reflected by the second interface; hence, the two beams of light reflection 24 optically interfere with each other to become attenuated.

The incident light 22 entered into the low refractive index layer 14 is scattered when it is reflected by the third interface (i.e., roughened surface 18).

Thus, the reflected light 24 from the third interface is scattered by means of the roughened surface 18 so that the formation of a reflected image due to the reflection of the ambient light (i.e., the reflected light 24) on the surface of the display screen of a vehicle meter or a display on a personal computer can be effectively prevented to enhance the contrast on the display screen and provide a display of better quality.

Specifically, at least one of the low refractive index layers 14 forming the third interface with the high refractive index layer 12 may be roughened to realize the roughened surface 18.

Figure 3:
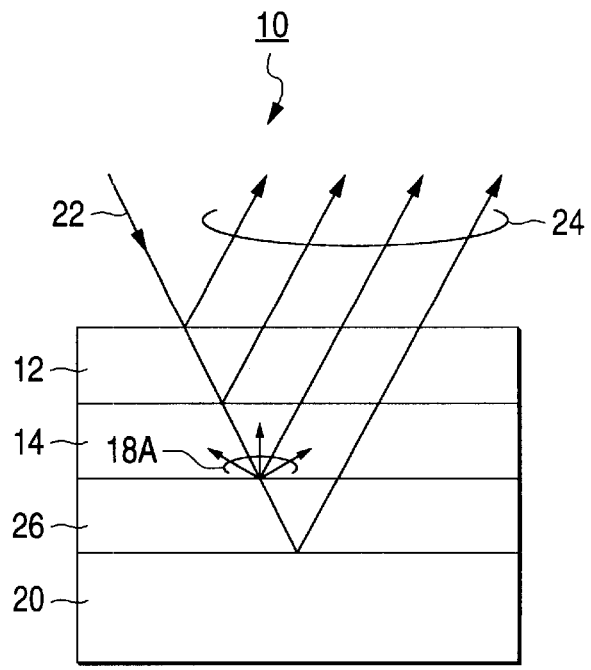
FIGS. 3(a) and 3(b) are cross sections each showing a third embodiment of the invention.
Figure 3:
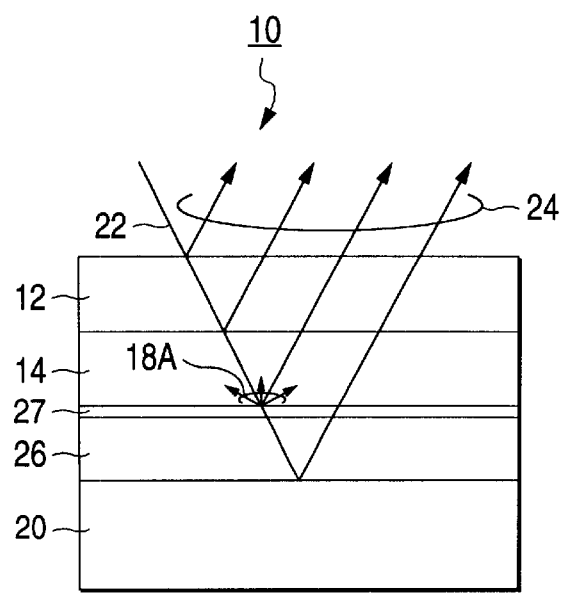
Figure 4:
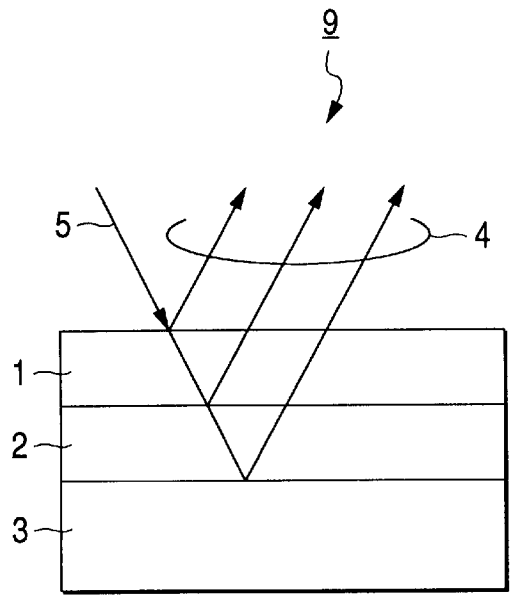
FIGS. 4(a) and 4(b) are cross sections showing two prior art antireflection coatings.
Figure 4:
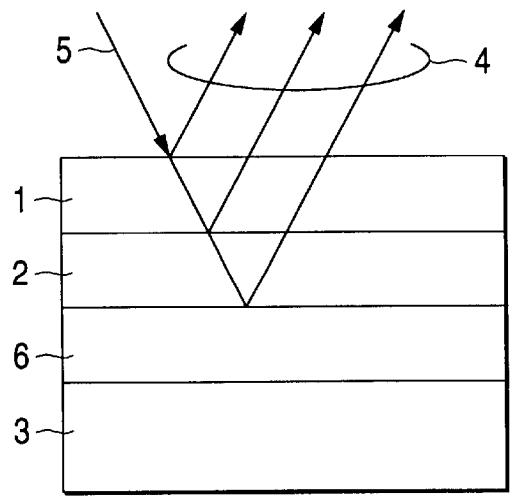

FIG. 3(a) is a cross section showing a third embodiment of the antireflection coating 10 of the invention. Those parts which are identical to the parts already described in connection with the first or second embodiment are identified by like numerals and will not be described redundantly.

The antireflection coating 10 comprises the substrate 20 having a hard coating layer 26 formed thereon, and the hard coating layer is further coated with the low refractive index layer 14 having a specified refractive index which in turn is coated with the high refractive index layer 12 having a higher refractive index than that low refractive index layer 14.

The hard coating layer 26 is formed with a light-diffusing material dispersed therein so as to scatter and reflect the incident light 22 entered into the low refractive index layer 14 in contact with the hard coating layer 26.

In the third embodiment, the hard coating layer 26 has a refractive index not higher than that of the substrate 20; hence, the refractive index of the hard coating layer 26 is equal to or lower than the refractive index of the substrate 20.

In FIG. 3(a), the single low refractive index layer 14 and the single high refractive index layer 12 are superposed on the substrate 20. However, this is not the sole case of the invention and two or more sets of the low refractive index layer 14 and the high refractive index layer 12 may be superposed periodically on the hard coating layer 26.

As shown in FIG. 3(a), incident light falling on the antireflection coating 10, as it enters the high refractive index layer 12 and the low refractive index layer 14, is reflected first at the first interface between air and the high refractive index layer 12, then at the second interface between the high refractive index layer 12 and the low refractive index layer 14, whereby two beams of light reflection 24 are produced.

The optical thicknesses of the high refractive index layer 12 and the low refractive index layer 14 are so set that the reflected light 24 from the first interface has a phase difference of ¼λ from the light 24 reflected by the second interface; hence, the two beams of light reflection 24 optically interfere with each other to become attenuated.

The incident light 22 entered into the low refractive index layer 14 is reflected while being scattered at primarily the third interface.

Thus, the reflected light 24 from the third interface is scattered more efficiently by means of the hard coating layer 26 having the above-described light-diffusing capability so that the formation of a reflected image due to the reflection of the ambient light (i.e., the aforementioned reflected light 24) on the surface of the display screen of a vehicle meter or a display on a personal computer can be prevented more efficiently to further enhance the contrast on the display screen and provide a display of even better quality.

If desired, a light-diffusing layer 27 having the same light-diffusing capability as the hard coating layer 26 may be formed on either the substrate 20 or the hard coating layer 26 (FIG. 3(b)). In this case, a light-diffusing material is desirably dispersed in the light-diffusing layer 27 so that it exhibits the light-diffusing capability. It is also desirable that the hard coating layer 26 has the same refractive index as the substrate 20.

Thus, the reflected light 24 from the third interface is scattered by means of the light-diffusing layer 27 so that the formation of a reflected image due to the reflection of the ambient light (i.e., the reflected light 24) on the surface of the display screen of a vehicle meter or a display on a personal computer can be effectively prevented to enhance the contrast on the display screen and provide a display of better quality.

As described above, the present invention has the following effects.

According to the first to third aspects of the invention, the reflected light from the third interface is scattered by means of the roughened surface so that the formation of a reflected image due to the reflection of the ambient light (i.e., the reflected light) on the surface of the display screen of a vehicle meter or a display on a personal computer can be effectively prevented to enhance the contrast on the display screen and provide a display of better quality.

According to the fourth aspect of the invention, in addition to the advantages of the first to third aspects of the invention, the reflected light from the third interface is scattered more efficiently by means of the hard coating layer so that the formation of a reflected image due to the reflection of the ambient light (i.e., the aforementioned reflected light) on the surface of the display screen of a vehicle meter or a display on a personal computer can be prevented more efficiently to further enhance the contrast on the display screen and provide a display of even better quality.

According to the fifth to seventh aspects of the invention, the reflected light from the third interface is scattered by means of the light-diffusing layer so that the formation of a reflected image due to the reflection of the ambient light (i.e., the reflected light) on the surface of the display screen of a vehicle meter or a display on a personal computer can be effectively prevented to enhance the contrast on the display screen and provide a display of better quality.

According to the eighth aspect of the invention, in addition to the advantages of the fifth to seventh aspects of the invention, the reflected light from the third interface is scattered more efficiently by means of the hard coating layer so that the formation of a reflected image due to the reflection of the ambient light (i.e., the aforementioned reflected light) on the surface of the display screen of a vehicle meter or a display on a personal computer can be prevented more efficiently to further enhance the contrast on the display screen and provide a display of even better quality.

According to the ninth aspect of the invention, the reflected light from the third interface is scattered by means of the hard coating layer having a light-diffusing material dispersed therein so that the formation of a reflected image due to the reflection of the ambient light (i.e., the reflected light) on the surface of the display screen of a vehicle meter or a display on a personal computer can be effectively prevented to enhance the contrast on the display screen and provide a display of better quality.

According to the tenth aspect of the invention, in addition to the advantages of the ninth aspect of the invention, the reflected light from the third interface is scattered more efficiently by means of the hard coating layer having a light-diffusing material dispersed therein so that the formation of a reflected image due to the reflection of the ambient light (i.e., the aforementioned reflected light) on the surface of the display screen of a vehicle meter or a display on a personal computer can be prevented more efficiently to further enhance the contrast on the display screen and provide a display of even better quality.

What is claimed is:

1. An anti-reflective coating comprising:

a transparent substrate layer having a refractive index Ns;

a first layer having a refractive index N1 lower than Ns and formed over the substrate layer;

a second layer having a refractive index N2 higher than N1 but lower than Ns, and formed over the first layer; and a light scattering region provided between the substrate layer and the second layer and having heterogeneities causing the light scattering;

wherein the heterogeneities have an average size that is less than each of the thicknesses of the first and the second layers, and wherein the scattering region is provided as a roughened surface of the first layer in contact with the substrate layer.

2. An anti-reflective coating comprising:

a transparent substrate layer having a refractive index Ns;

a first layer having a refractive index N1 lower than Ns and formed over the substrate layer;

a second layer having a refractive index N2 higher than N1 but lower than Ns, and formed over the first layer; and a light scattering region provided between the substrate layer and the second layer and having heterogeneities causing the light scattering;

wherein the heterogeneities have an average size that is less than each of the thicknesses of the first and the second layers, and wherein the scattering region is provided as a roughened surface of the first layer.

3. An anti-reflective coating comprising:

a transparent substrate layer having a refractive index Ns;

a first layer having a refractive index N1 lower than Ns and formed over the substrate layer;

a second layer having a refractive index N2 higher than N1 but lower than Ns, and formed over the first layer;

a third layer having a refractive index N3 and formed between the substrate layer and the first layer for smoothing an interface between the substrate layer and the third layer; and a light scattering region provided between the substrate layer and the second layer and having heterogeneities causing the light scattering;

wherein the heterogeneities have an average size that is less than each of the thicknesses of the first and the second layers, and wherein the scattering region is provided as a roughened surface of the first layer in contact with the third layer.

4. An anti-reflective coating comprising:

a transparent substrate layer having a refractive index Ns;

a first layer having a refractive index N1 lower than Ns and formed over the substrate layer;

a second layer having a refractive index N2 higher than N1 but lower than Ns, and formed over the first layer;

a third layer having a refractive index N3 and formed between the substrate layer and the first layer for smoothing an interface between the substrate layer and the third layer; and a light scattering region provided between the substrate layer and the second layer and having heterogeneities causing the light scattering;

wherein the heterogeneities have an average size that is less than each of the thicknesses of the first and the second layers, and wherein the scattering region is provided as a roughened surface of the first layer.

5. The anti-reflective coating as set forth in claim 3, wherein $N3 \leq Ns$.

6. The anti-reflective coating as set forth in claim 4, wherein $N3 \leq Ns$.

7. The anti-reflective coating as set forth in claim 1, wherein the first and second layers have a thickness in the range of 20 to 100 nm, respectively.

8. The anti-reflective coating as set forth in claim 2, wherein the first and second layers have a thickness in the range of 20 to 100 nm, respectively.

9. The anti-reflective coating as set forth in claim 3, wherein the first and second layers have a thickness in the range of 20 to 100 nm, respectively.

10. The anti-reflective coating as set forth in claim 4, wherein the first and second layers have a thickness in the range of 20 to 100 nm, respectively.

* * * * *